United States Patent [19]

Cibor

[11] Patent Number: 5,076,009
[45] Date of Patent: Dec. 31, 1991

[54] CHRISTMAS TREE WATERING SYSTEM

[76] Inventor: Michael Cibor, 1027 Highland, Lincoln Park, Mich. 48146

[21] Appl. No.: 229,252

[22] Filed: Aug. 8, 1988

[51] Int. Cl.[5] ............... A47G 33/12; A47G 7/02
[52] U.S. Cl. .................................. 47/40.5; 47/79
[58] Field of Search ............... 47/40.5, 79, 48.5, 80, 47/81, 82; 248/519, 523, 524, 525, 529; 137/413, 428, 430

[56] References Cited

U.S. PATENT DOCUMENTS

| | | | |
|---|---|---|---|
| 1,453,401 | 5/1923 | Mattson | 47/79 X |
| 3,311,270 | 3/1967 | Juergens | 47/48.5 X |
| 3,469,342 | 9/1969 | Morris | 47/40.5 X |
| 3,697,026 | 10/1972 | Hambrick | 47/40.5 X |
| 3,893,475 | 7/1975 | Hudson | 137/414 |
| 4,121,608 | 10/1978 | MacLeod | 47/79 X |
| 4,248,013 | 2/1981 | Allen | 47/80 X |
| 4,300,311 | 11/1981 | Marchant | 47/79 X |
| 4,653,224 | 3/1987 | Weckesser | 47/79 X |
| 4,745,706 | 5/1988 | Muza | 47/48.5 X |
| 4,825,587 | 5/1989 | Stancil | 47/40.5 |

Primary Examiner—Danton D. DeMille
Attorney, Agent, or Firm—John R. Benefiel

[57] ABSTRACT

A water supply system for Christmas tree stands, in which an elevated table top reservoir is connected via tubing to a sealed float valve assembly mounted alongside the tree trunk by cinch straps encircling a housing extension member. The float element is slidably mounted within the housing and moves against a valve port to maintain a water level in the tree stand.

8 Claims, 1 Drawing Sheet

U.S. Patent  Dec. 31, 1991  5,076,009
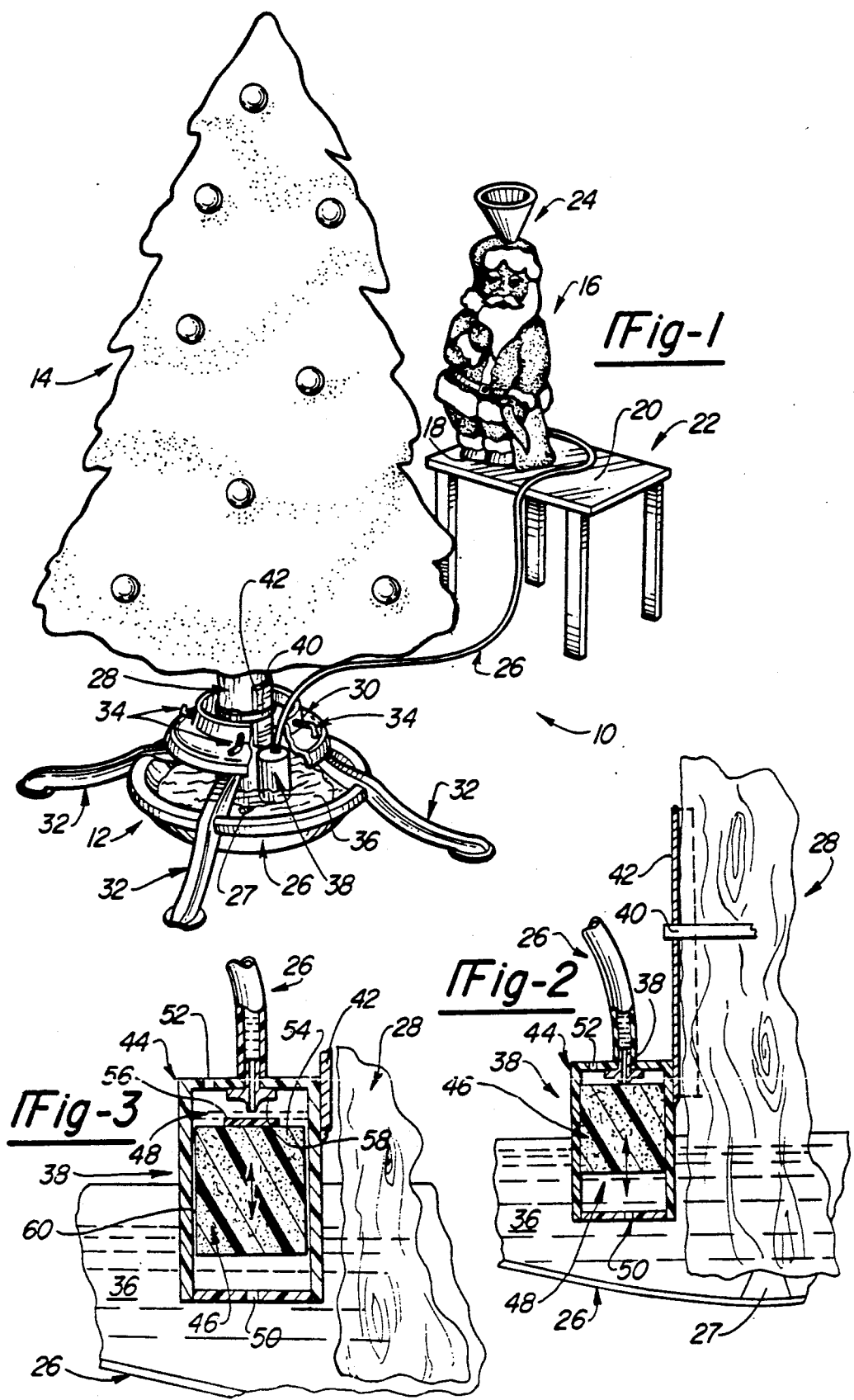

CHRISTMAS TREE WATERING SYSTEM

FIELD OF THE INVENTION

This invention concerns watering devices, and more particularly devices adapted to facilitate the maintenance of a water supply in the base of a Christmas tree stand.

DESCRIPTION OF THE PRIOR ART

The problem of conveniently maintaining a water supply in the base of a stand for Christmas trees has heretofore received attention in the prior art. The problem arises from the inconvenience of constantly filling and checking the water level in the base, given its location at the bottom and center of the tree. Given the rapid absorption of water by most trees in the dry environment of a heated interior space, this inconvenience is significant.

Separate reservoirs connected to the base by a length of tubing have heretofore been contrived, as for example the design shown in U.S. Pat. No. 3,469,342, which involve a reservoir disposed at floor level. This approach creates an obstacle to foot traffic and still requires bending over to check and fill the reservoir.

There has also heretofore been offered for sale a tree hung ornament adapted to receive water and direct the same to the base via float controlled valving. The disadvantage to that approach is the limitation on the quantity of water able to be held in the ornament, since only a relatively light weight is able to be borne by the branches of the tree. Thus, frequent attention to filling with water is required. The tree mounted location also raises the possibility that the reservoir will fall, spilling water to create an electrical shock hazard, and also involves a two handed procedure. The exposed float valving also renders the device liable to jamming and consequent flooding.

The method of installing the float valve is inconvenient, requiring mounting the tree base over an anchoring lip.

Accordingly, it is an object of the present invention to provide a tree watering device adapted to conveniently allow maintenance of a water supply in the tree base without frequent attention to this chore.

It is another object to provide such a device which is convenient to install and reliable in operation, with a minimum possibility of flooding or accidental spillage and breakage.

SUMMARY OF THE INVENTION

These and other objects of the present invention as will be implicit from the present application are achieved by a system including an elevated, table supported, relatively large volume reservoir connected to a completely enclosed float valve disposed in the tree base bowl, which valve is secured to the tree trunk by a wrapping extending around the tree trunk and a concave float housing extension member fit against the tree trunk. The float valve comprises an elongated housing in which is slidably mounted a float member adopted to move against a protruding port into which water is introduced. The valving member is preferably a piece of light weight foam plastic bearing a resilent valve seat material which provides an effective and reliable shut-off at low cost.

The float valve housing is completely closed except for a small vent hole at the top and an outlet hole at the bottom to prevent any interference of debris with float movement or proper valve seating.

Thus, an extended period of a reliable constant water supply in the tree base is enabled, which is convenient in use and does not present hazards of flooding, spillage, ornament breakage or shock hazard.

DESCRIPTION OF THE DRAWINGS

FIG. 1 is a perspective view of a Christmas tree supported in a stand, with a watering device according to the present invention installed therein.

FIG. 2 is an enlarged fragmentary sectional view of the float valve component of the watering device according to the present invention together with adjacent portions of the tree trunk and tree base.

FIG. 3 is a further enlarged sectional view of the float valve, shown with the float element in a valve open position.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Referring to the Drawings, and more particularly FIG. 1, the watering system 10 is adapted to maintain a water supply in the base 12 supporting a Christmas tree 14. The watering system according to the present invention includes a relatively large volume elevated reservoir 16, i.e., a container adapted to hold several quarts of liquid. The reservoir has a flat, relatively broad bottom 18 so as to be supported on the top 20 of an adjacent table 22 or other furniture item.

The reservoir 16 is formed in a decorative shape such as the Santa Claus as shown with a vent hole in the top thereof enabling filling with water, as with a removable funnel 24. A venting snap on lid (not shown) may be employed when not filling.

A length of tubing 26, has one end connected to the lower level of the reservoir 16 to enable outflow of water contained therein by gravity to the lower end of the tubing extending to the base 12.

The base 12 may be of any conventional design having a bowl-shaped piece 26 adapted to receive the trunk 28, with a ring shaped support 30 connected to three support legs 32 also connected to piece 26. Suitable threaded rods 34 and a prong 27 engage the tree trunk 28 in the manner well known to those skilled in the art. The interior space 36 of piece 26 is adapted to contain a volume of water sufficient to submerge the butt end of the tree trunk 28.

A generally cylindically shaped float valve assembly 38 is strapped to the lower end of the tree trunk 28, by means of a cinching strap 40 passing around a float housing extension member 42 integral with the float valve assembly 38. The extension member is concourse to be fit against the tree trunk and resist tilting of the assembly.

FIGS. 2 and 3 illustrate that the float valve assembly 38 includes elongated, cylindrical housing 44 fastened to the housing extension member 42 so as to be disposed alongside the tree trunk 28 in a vertical orientation, partially submerged in the water in space 36 of piece 26.

The housing 44 contains a float element 46, which is slidably fit to the shape of an internal cavity 48 defined by the housing 44. The float element 46 is constructed of a lightweight material such as a foam plastic to have a much lower density than water, creating a strong buoyant force when submerged even partially in the water in space 36.

Water is adapted to enter and leave the cavity 48 via an opening 50 in the bottom wall of housing 44.

The space above the float element 46 is vented by means of an opening 52 to allow free up and down movement of the float element 46. The top face 54 of the float element 46 carries a valve seat 56 constructed of a suitably durable resilient material such as rubber. Valve seat 56 is located so as to come into contact with an inlet port 58 connected to tubing 26 so as to allow inflow of water into cavity 48. Water flowing into port 58 flows past clearance space 60 existing between float element 46 and out opening 50 to fill the space 36 in piece 26.

When the water level reaches the point where float element 46 floats, continued raising of the float element 46 forces it against the inlet port 58 to shut off further inflow. The float element 46 will seat and unseat as necessary to maintain the water at that level. The float assembly 38 is installed at the appropriate water level desired in the base 12, sufficient to keep the tree trunk 28 immersed.

This system enables convenient maintainence of the water supply for the tree, since the relatively large volume of water able to be stored in the reservoir 16 minimizes the need for refilling. The elevated table top location makes such refilling easy, when required, and keeps the reservoir out of the way to reduce hazards associated with water spillage or the electrically powered ornaments.

The enclosed design of the float assembly 38 reduces the incidence of jamming, and is easily installed when the tree 14 is being trimmed, with water then added conveniently to the reservoir 16 to fill the space 36.

The system is simple in configuration and able to be manufactured at low cost.

I claim:

1. In combination with a Christmas tree stand having a cavity to receive the trunk of a Christmas tree and means for clamping said trunk therein, said cavity defining a watering space, and a water supply system for supplying water to said watering space of said Christmas tree stand to maintain a predetermined level therein, said water supply system comprising:
    a reservoir having a flat bottom adapted to be supported on a flat surface elevated above said Christmas tree stand, an opening in the top thereof enabling filling said reservoir with water;
    a length of tubing having one end connected to the lower level of said reservoir to allow outflow of water therefrom;
    a float assembly disposed within said watering space and connected to the other end of said length of tubing to receive water flow;
    said float assembly including a float element and a float housing enclosing said float element for movement therein, said housing having a top and a bottom end wall and an inlet valve port at the top endwall thereof connected to said length of tubing, said inlet valve port receiving water flow from said length of tubing, said housing including openings enabling water to rise therein to the level of water in which said housing is immersed, mounting means for attaching said housing to the trunk of said Christmas tree at a selected level in said Christmas tree stand within said watering space and at said predetermined water level therein, said float element movable vertically within said housing against and away from said inlet valve port to control inflow of water from said reservoir, and maintain a predetermined water level in said Christmas tree stand corresponding to the level whereat said float moves against said inlet valve port.

2. The system according to claim 1 wherein said float housing is generally cylindrical and defines a cylindrical cavity therein, within which is slidably mounted said float element.

3. The system according to claim 2 wherein said housing completely encloses said float element.

4. The system according to claim 3 wherein said float element and said housing have a clearance space therebetween, with openings in the top and bottom end walls of said housing.

5. The system according to claim 4 further including a resilient valve seat mounted on the upper face of said float element adapted to contact said valve port.

6. The system according to claim 5 wherein said float element comprises a plastic cylinder.

7. The system according to claim 2 wherein said mounting means includes an elongated housing extension member fixed to said housing, extending upwardly, and further including a cinching strap adapted to encircle said extension member and said Christmas tree trunk.

8. The system according to claim 1 wherein said reservoir contains several quarts of water.

* * * * *